(12) United States Patent
Grandais

(10) Patent No.: US 7,318,147 B2
(45) Date of Patent: Jan. 8, 2008

(54) METHOD FOR DELAYING AND EXECUTING SYSTEM ADMINISTRATION OPERATIONS IN UNATTENDED MODE

(75) Inventor: Jean Grandais, Roncq (FR)

(73) Assignee: International Business Machines Corporation, Armonk, NY (US)

(*) Notice: Subject to any disclaimer, the term of this patent is extended or adjusted under 35 U.S.C. 154(b) by 1527 days.

(21) Appl. No.: 10/017,227

(22) Filed: Dec. 7, 2001

(65) Prior Publication Data

US 2007/0162730 A1     Jul. 12, 2007

(30) Foreign Application Priority Data

Dec. 7, 2000    (EP)    .................................. 00480113

(51) Int. Cl.
*G06F 15/177*    (2006.01)
(52) U.S. Cl. .............................. 713/1; 714/46; 707/200
(58) Field of Classification Search .................... 713/1; 714/46; 707/200, 202, 204
See application file for complete search history.

(56) References Cited

U.S. PATENT DOCUMENTS 5,237,677 A * 8/1993 Hirosawa et al. .............. 714/57
6,366,919 B2 * 4/2002 O'Kane et al. ............. 707/101

* cited by examiner

Primary Examiner—Thuan Du
(74) Attorney, Agent, or Firm—Douglas W. Cameron

(57) ABSTRACT

A method allowing a user interfacing a computer with a console, to delay the execution of system administration operations and to have them executed in unattended mode on said computer. The method comprises the first step of seizing identification of the user at the console and checking authorization. If user authorized the method comprises the step of seizing at the console and storing in a working storage area the characteristics of the system currently active on the computer, parameters describing the administration operations to be performed on the computer, the type of system restart to be performed after administration operations in unattended mode the delay to be waited for before starting said administration operations. Then, the method requires to the operating system of the computer to start delay. When delay is expired, the method initializes the computer peripherals according to the parameters describing the administration operations stored in the working storage area and sets the operating system in a sleeping state. Then, the administration operations are performed according to the administration operations parameters stored in the working storage. Finally, the characteristics of the system which was active on the computer and the type of system restart are retrieved from the working storage and the system is restarted according to the retrieved information.

10 Claims, 5 Drawing Sheets

METHOD FOR DELAYING AND EXECUTING SYSTEM ADMINISTRATION OPERATIONS IN UNATTENDED MODE

FIELD OF THE INVENTION

The present invention generally relates to system administration operations and more particularly to unattended automatic maintenance operations on computer systems.

BACKGROUND OF THE INVENTION

The administration of systems consists in the execution of operations for maintaining the operating systems, the network and the data of data processing system. These operations may comprise backup of the operating systems on the computers, reorganization and validity checking of storage for user data.

These maintenance operations are started with commands entered from the operator console locally attached to the computer. These operations are performed by the system administrator on site, when no user application is started and when the network is not active. Usually the maintenance of a data processing system is performed during the weekends, when the system and the network are unused.

Thus, there is a need for having the maintenance operations performed in unattended mode without the presence of the system administrator on site.

As with the IBM AS/400 (AS/400 is a trademark of IBM Corporation in certain countries), some systems have a possibility to delay the commands for maintenance operations on the operating system: mainly these operations concern backup of systems on hard disks. Unfortunately, the maximum delay time may be not sufficient to postpone the execution from one day to two days later. This restriction prevents a system administrator to delay on Friday the execution of system maintenance for the next Sunday morning. As a matter of fact this is a facility that the companies selling services to IBM AS/400 users, for instance, would like to offer. The system backup command provided in the operating system of the IBM AS/400 is the GO SAVE command accepting a time parameter limited to 24 hours. This means that if today, Friday, at 12:00 am we start a GO SAVE command with a delay hour of 1:00 p.m., the backup operation will start at 1:00 p.m. this same day Friday and not the next day because starting at 1:00 the next day would use a delay of more than 24 hours.

Moreover, to execute the maintenance operations on a data processing systems, the operating systems have to enter a special 'sleeping state' preventing them from any outside interference which could damage their integrity. Particularly, maintenance operations on the IBM AS/400 server, are executed when the system is in 'restricted state'. If a problem occurs during the execution of the unattended operations during the weekend, the operating systems need to be restored to their operational mode, user applications and networks need to be restarted for Monday morning.

This is why the first objective of the invention is to provide a method for delaying to the coming days maintenance operations of systems which do not offer this facility.

It is a second objective of the invention to have a method allowing the maintenance operations to be performed in a secure way for the availability of the data processing system which have to go back to operational mode.

SUMMARY OF THE INVENTION

The invention consists in a method and computer module allowing a user interfacing a computer with a console, to delay the execution of system administration operations and to have them executed in unattended mode on said computer. The method comprises the first step of seizing identification of the user at the console and checking authorization. If user authorized the method comprises the step of seizing at the console and storing in a working storage area the characteristics of the system currently active on the computer, parameters describing the administration operations to be performed on the computer, the type of system restart to be performed after administration operations in unattended mode the delay to be waited for before starting said administration operations. Then, the method requires to the operating system of the computer to start delay. When delay is expired, the method initializes the computer peripherals according to the parameters describing the administration operations stored in the working storage area and sets the operating system in a sleeping state. Then, the administration operations are performed according to the administration operations parameters stored in the working storage area. Finally, the characteristics of the system which was active on the computer and the type of system restart are retrieved from the working storage area and the system is restarted according to the retrieved information.

Following the first objective, with the solution of the invention we are able to delay the system operation on when it is not possible to do so with the operating system of the computer. The delay duration depends on the programming limitation of the parameters (day, hours, minutes) seized at the operator console. The solution of the invention uses an operating system service, the Job delay which is commonly available in the operating systems. The delay of the method of the invention will have the same limitation than the delay job system service which has usually no delay duration limitations.

The solution of the invention fulfills the second objective which is of having the unattended operations performed in secure way as for the availability of the system. With the solution of the invention the system is restarted as requested by the system administrator either in case of normal completion of the maintenance operations, either in case of abort during the execution.

An advantage of the solution is the usability of the method: the return code of operations are logged and sent to the output print spooler and will be printed on request by the system administrator when the system is restarted. Consequently, after completion of the module, whatever the result, the system administrator can have a report of the execution and can understand and modify the process or correct a detected problem for next unattended execution.

It is noted also that with the method of the invention, the command can start a delay and unattended operations not only for the standard backup system commands of operating system maintenance but also any customized maintenance operations such as reorganization of specific user data bases etc. . . .

DESCRIPTION OF THE PREFERRED EMBODIMENT

Figure 1:
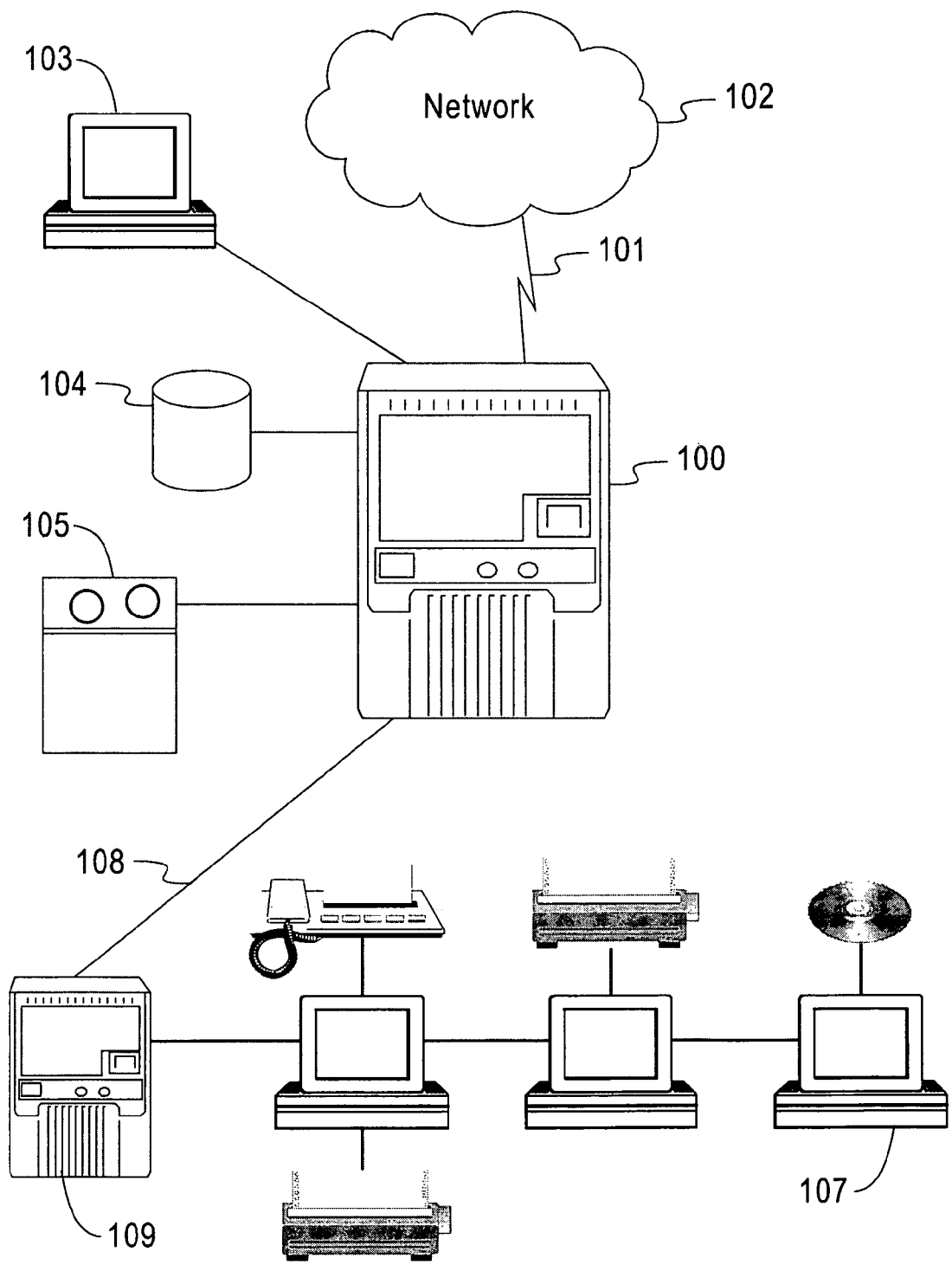
FIG. 1 is a representation of the data processing system implementing the solution of the present invention.

FIG. 1 shows a data processing system comprising a computer (100) which is an IBM AS/400 in the preferred embodiment comprising an operating system to be saved according to the present invention.

This computer can be locally connected (108) to one other computer (109) and a local area network (107) representing the customer site equipment.

The maintenance of the computer (100) will consist in maintenance operations on its operating system which is OS/400 in the preferred embodiment and on user data located on a computer data base (104). The tape unit (105) is a peripheral of the computer commonly used to save data copies during maintenance operations. In its operational mode the computer interfaces the other computer and local area network (107) and the external world through a network (102) to which it is connected through at least one telecommunication line (101).

The method of the preferred embodiment is implemented as a program operating on the computer. This program is executed when called as a command from the operator console. This program calls successive modules. With the preferred embodiment the maintenance operation is performed in two timing phases. In the first phase the system administrator starts a command from the operator console (103) locally connected to the computer. In this first phase, the parameters of the customers defining the date and time for the maintenance and the type of operations being performed are seized, controlled and stored. The setting of parameters is done during working hours of the business week. The second phase occurs generally during the weekend and in unattended mode. On the computer (100) to be maintained automatically starts a maintenance task consisting in one or more maintenance operations at the date and time captured during the first phase. During this phase the tape unit (105) can be written if the maintenance task includes system saving. The user data base (104) is accessed if the maintenance task includes an operation of reorganization and/or validity checking of user data.

A similar preferred embodiment is also implemented on the second computer (109) only for the purpose of maintenance of its operating system as the user data are centralized in the user data base (104) of the first computer.

Figure 2:
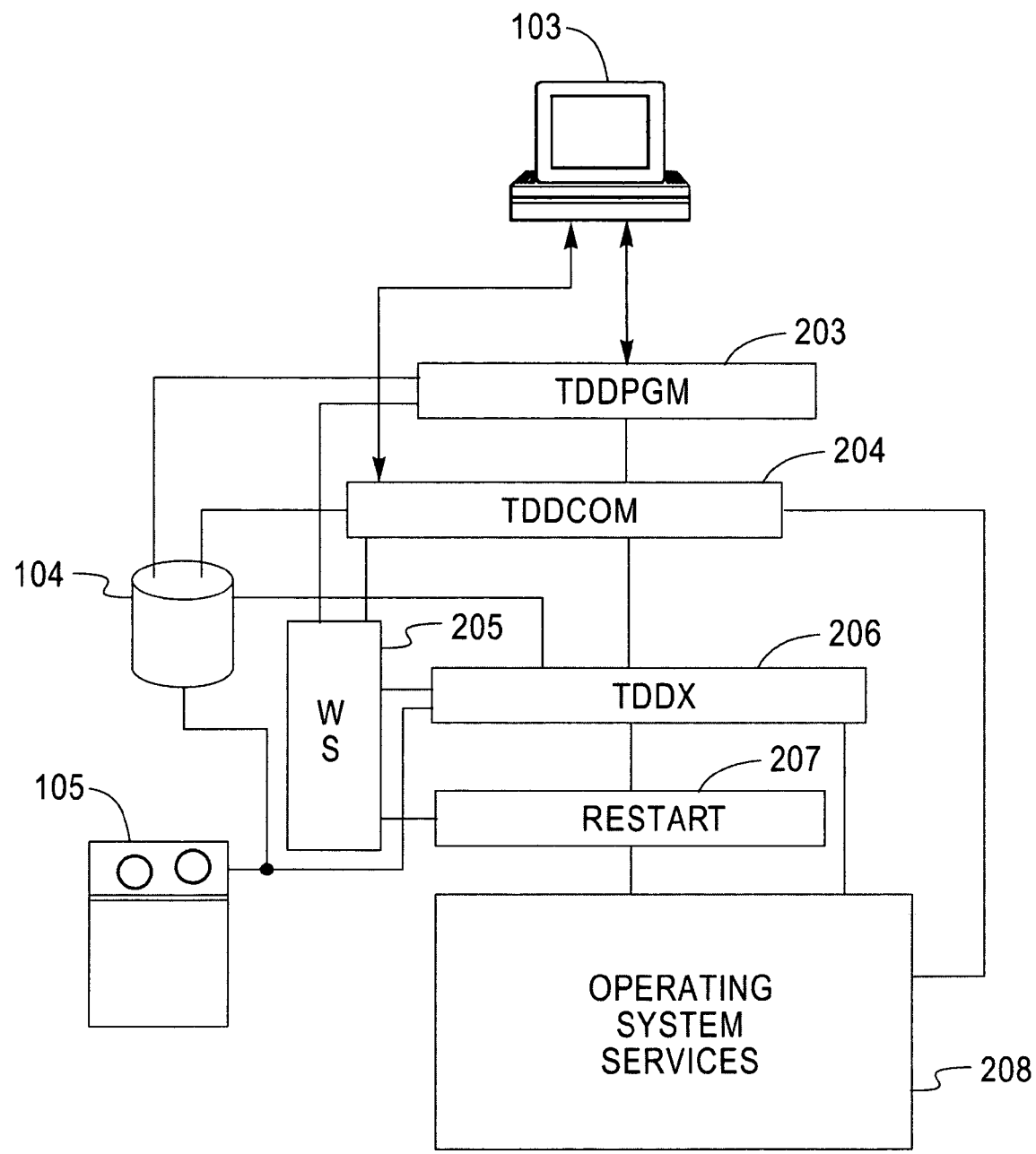
FIG. 2 is a view of the logical block of the software implementation of the present invention.

FIG. 2 illustrates the logical blocks of the implementation of the preferred embodiment and their access to the different components of the computer such as storage area and peripherals. The logical blocks of the implementation of the preferred embodiment (TDDPGM (203), TDDCOM (204), TDDX (206), RESTART (207)) form a software program operating on the computer to be maintained. The operating system services (208) are part of the operating system of the computer. When the computer is an IBM AS/400, they form the operating system services of the OS/400. Only the logical block TDDCOM (204) accesses (dotted line) the system services. Also are illustrated the computer peripherals (103, 104, 105). The connexions between the logical blocks and the accesses from the logical blocks to the computer peripherals are illustrated also with dotted lines. The logical blocks TDDPGM and TDDCOM access the operator console. A storage area for storing data (WS, for working storage area (205)) is accessed (dotted lines) by all the logical blocks of the preferred embodiment of the invention. All the logical blocks access the working storage area (205). The tape unit (105) is only accessed from the logical block TDDX (206). All the logical blocks access the user data base (104).

Figure 3A:
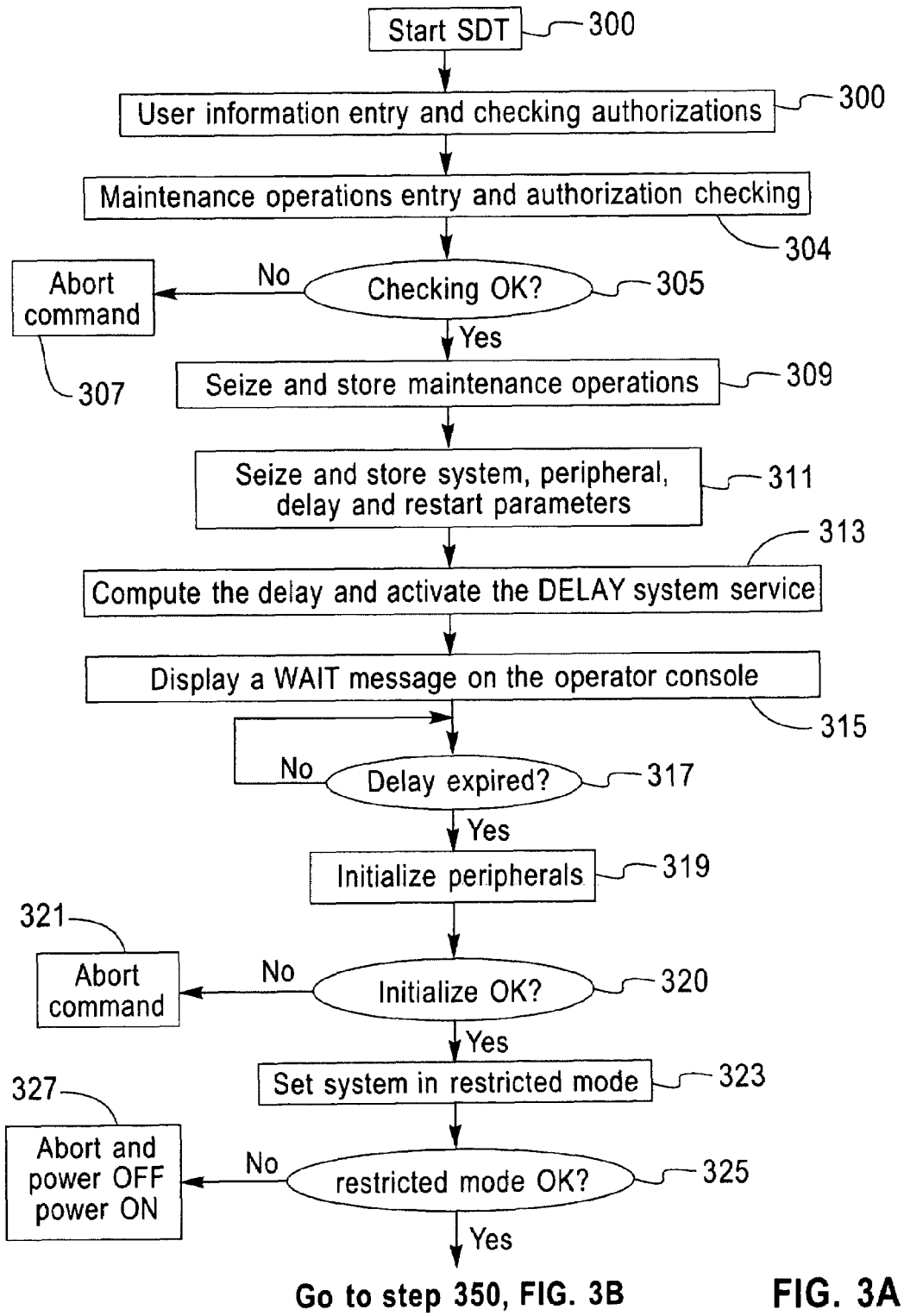
FIG. 3A is the first part of the general flow chart of the preferred embodiment according to the present invention.
Figure 3B:
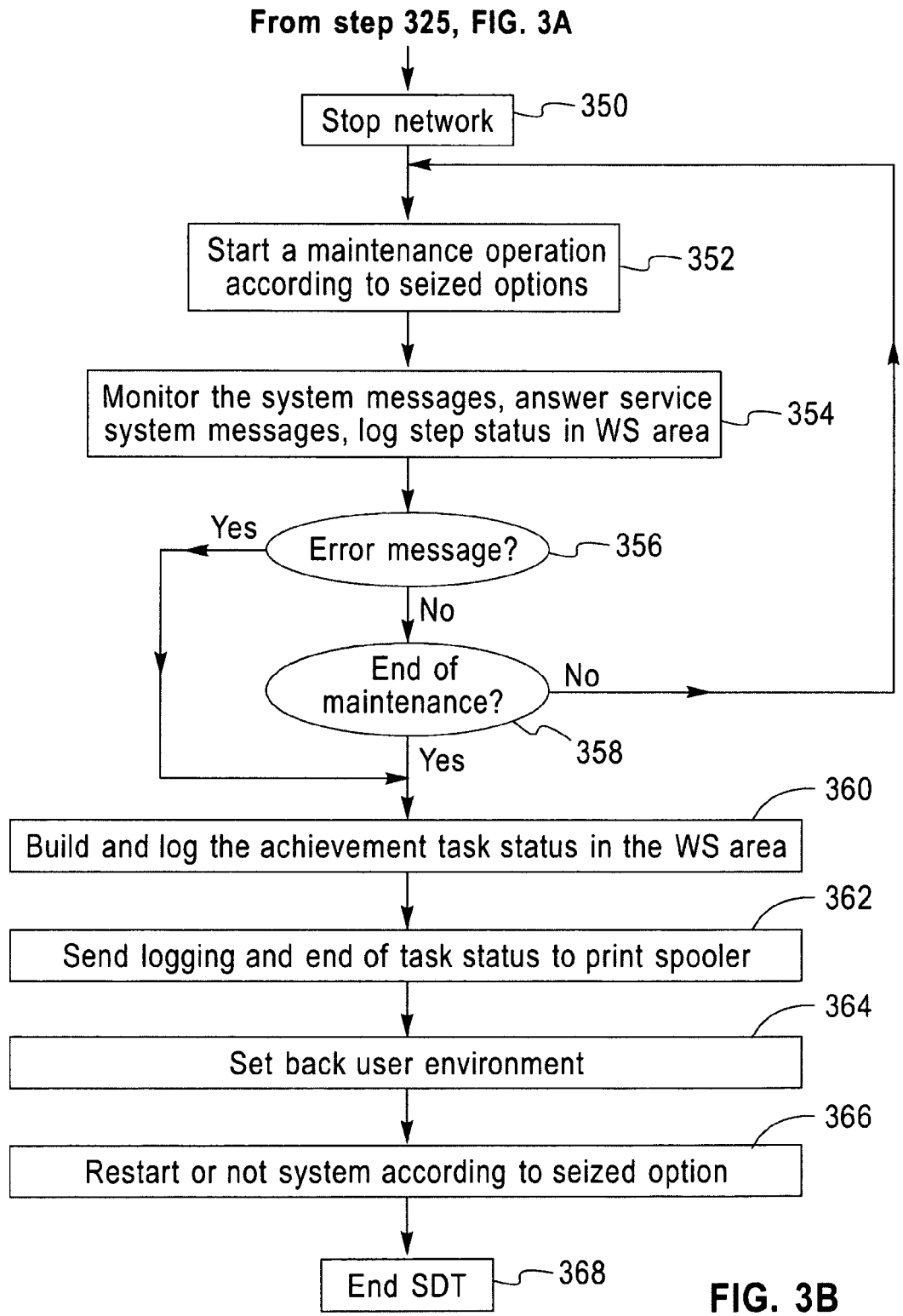
FIG. 3B is the second part of the general flow chart flow chart of the preferred embodiment according to the present invention.

FIGS. 3A and 3B form the general flow chart of preferred embodiment of the invention. In FIG. 3A the command 'SDT', for Start Delayed Task, is first started (300) from the operator console. In the preferred embodiment when the command is started, a first module, TDDPGM (steps 302 to 307), is executed. The programming language is, on the IBM AS/400 computer whose the operating system is the IBM OS/400, the Control Language (CL) providing instructions to use the system services.

The TDDPGM module interfaces with the operator console through a user interface to seize information. The user interface allows creation of screen formats and data files. With the IBM AS/400 the screens are created using the SCREEN DESIGN AID utility. The screen format and screen data are stored in files. The display of a screen is called with the SNDF (send file) CL instruction followed by two parameters, the screen format name and the name of the file containing the screen data. To seize data in a screen the SNDRCVF (send and receive file) CL command is used.

First, the user profile is seized and checked against its rights (302). Other checking are performed for free time usage, a special key is required. The information on the system currently active is retrieved and stored in a data area, the Working Storage (WS) area. This information is then used by the TDDPGM module to check the authorization of the user to start the SDT command. A checking is also performed on the operator console starting SDT. In the preferred embodiment a SDT command can only be started from an operator. It is noted that an operator console is local only on AS/400 computer however, other computers may accept remotely connected operator console, the preferred embodiment of the invention can also apply to this case. The system administrator enters (304) through the user interface the maintenance operations he wants to be accomplished in unattended mode on the computer. The subsystem environment is also checked because the SDT options required must be compatible with the system environment of the customer according to his system customization. If one of these authorization checking fails (answer N to test 305), the SDT command is aborted (307).

If the command is not aborted during the checking (answer N to test 305), a second module, TDDCOM (steps 309 to 327) is started.

TDDCOM, through the user interface with the operator console, seizes the input parameters entered by the system administrator necessary to complete the description of the unattended operations to be performed as requested and authorized in the previous steps.

A first set of input parameters is seized and stored in the Working Storage area (309) describing the maintenance operations to be performed. In the preferred embodiment there are 9 choices. The first four choices are the four system backup options provided by the operating system of the IBM AS/400. The fifth choice is for reorganizing the system memory. Two other choices (6 and 7) correspond to customized user maintenance operations such as the reorganization or saving of the user data base etc. . . . The choices 8 and 9 are for execution of specific system services such as suppressing unused programs etc. . . . The user can choose one choice in the preferred embodiment.

The second set of inputs seized and stored (311) in the Working Storage area by TDDCOM module describes the system environment in which the unattended operation will be performed: system characteristics (user customized system shutdown command to be started, etc. . . . .) and the peripherals: initialization of tape unit, hard disk volume if backup operations etc. . . . The initialization of the peripherals can be done immediately or is delayed to the same time where the unattended maintenance operations will be executed.

The system administrator enters a third set of input parameters describing the delay to be achieved before starting the unattended maintenance operations. These parameters comprise the number of days to wait (0 to 5 in the preferred embodiment), the time to start (HH for hours and Mn for minutes). Then the restart parameters are seized and stored. These parameters describe which system and the state of the system that the system administrator wants to have restarted at the end of the maintenance operations. In the preferred embodiment, the state of the system to be restarted at the end of the maintenance operations can be of the following 5 choices: 'do a system power down' to stop the system after maintenance, 'do a system power down then restart system' if we want the system to be activated after these unattended maintenance operations, 'put back the system in operational mode by starting controlling subsystem representing the user customized system' if we want to set the system in operational mode, 'run restart user program XXXXX' if we have asked for setting the system in operational mode and started the XXXXX program or 'do nothing and let the system in restricted state'. All the information seized on the operator console during the execution of TDDCOM is stored in the Working Storage area.

The delay is computed (313) by the TDDCOM module from the input parameters. The module starts a system service used to delay the execution of jobs on the computer. This is a system service commonly available in the operating systems: there is usually a large delay which can be requested to delay a job in a system. With the operating system of the IBM AS/400 the command syntax is DLYJOB xxxxxx, where xxxxxx can be a maximum of 999999 seconds which is 11 days and 14 hours. One other limitation on the delay computed by the method of the invention could come from size the programming variables seizing the delay parameters at the operator console. In the preferred embodiment the maximum delay is the delay of the operating system for the job i.e. 999999 seconds which is 11 days and 14 hours. The DLYJOB command starts a timer of the value of the computed delay and advises back when the delay time is expired. During this time (answer N to test 317), the TDDCOM module displays (315) a WAIT message on the operator console.

When the delay expires (answer Y to test 317) SDT operates in unattended mode. The DELAY system service sends a message to TDDCOM module which starts logging of the events in a logging area of the working storage area. TDDCOM initializes the peripherals (320) to be used for execution of maintenance operations (tape unit, disk etc. . . .). If the peripheral initialization is not successful (answer N to test 320), the SDT command is aborted (321). It is noted that according to the options seized at the operator console the peripheral units are initialized immediately or at the time of the system maintenance operation execution. However, if an error is detected before the system is set in restricted mode, the SDT command can be aborted witout any affect on the system abort 307, 321). Conversely, if an error is detected preventing the execution of the SDT task after having set the system in restricted mode, the SDT command is aborted but the system needs to be restored. This will be the object of the following abort SDT command of the process (327, 356).

If the peripherals are initialized without any error (answer Y to test 320), TDDCOM module asks a system service to set the system in restricted mode (323), (instruction ENDSBS *all for restricted mode required for the system and all the subsystems in the preferred embodiment of the IBM AS/400 computer. If, after one hour the system cannot be set in a restricted mode (answer N to test 320), the SDT command is aborted (327) and the system is set to power off and power on to restart.

When the system is successfully set in restricted mode (answer Y to test 325), the selected maintenance operation module TDDx (steps 350 to 360) (x is from 1 to 9 in the preferred embodiment) corresponding to the selected option (x) is called for execution.

TDDx stops the network (350) currently active on the system. Then a task is activated (352) comprising the system services corresponding to the option: backup system or reorganization of user data base etc. . . . In the preferred embodiment the successive system services are called via the CL instructions which are SAVSYS to save all the system, SAVDLO *NONSYS to save all the libraries, SAVLIB for saving all the document files, SAV for saving the directories etc. . . .

During the execution of the system services instructions the system messages are captured (354) by TDDX and analyzed. TDDx sends answers back to the system. The error messages are monitored and the results of step executions are logged in the Working Storage area. If an error is detected (answer Y to test 356) during the execution of the system services, the TDDx module stops the execution of the following system services instructions. In any case, at the end of execution of system services instruction (answer Y to test 358 or 356), TDDx builds (360) the achievement task status and logs it as well in the working storage area. This completes the execution of TDDx module.

The RESTART module (steps 362 to 368) is then activated. The logging (362) of the execution of SDT including the achievement of the task status of TDDx is sent from the working storage area into a system output print spooler for further printing when the system will be restarted. The user environment is reset (364) according to the information previously stored in the working storage area. Then the system is restarted (366) or not (CL instruction is STRSBS) according to the option for restart which has been seized at the operator console and stored in the working storage area. This last step ends of the SDT command (368) and the program of the preferred embodiment of the invention.

Figure 4:
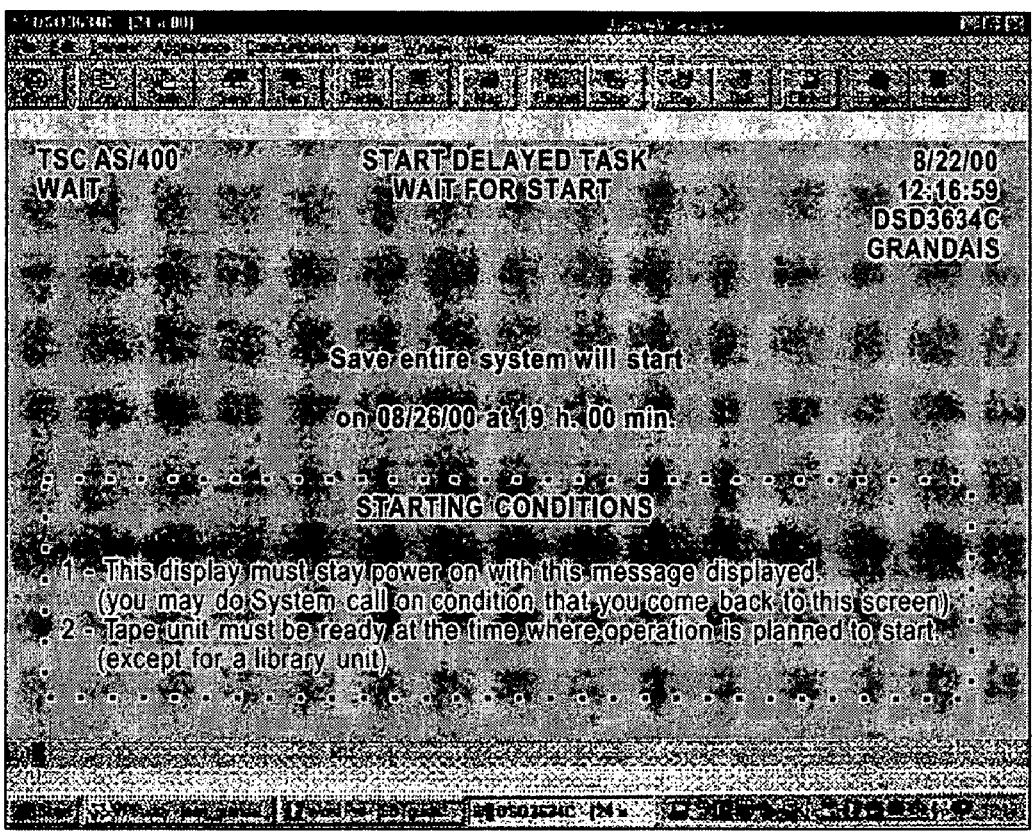
FIG. 4 is a screen print of the user interface used in the preferred embodiment of the present invention.

FIG. 4 is a screen print generated by the user interface of the operating system used in the preferred embodiment for communicating with the system administrator at the operator console. More particularly, the screen of FIG. 4 displays a Wait message during the period of delay requested before execution of the unattended operation of maintenance of the system in TDDCOM module. This screen has been created using the user interface available in the operating system of the IBM AS/400: the SCREEN DESIGN AID utility creates the screen format. The display of this screen is then called in the TDDCOM module using the SNDF (send file) instruction of the Control Language of the IBM AS/400, followed by two parameters, the screen format name and the name of the file containing the screen data. The other screens used to seize parameters from the operator console are similarly built and called in the modules. The other operating systems provide similar user interfaces.

The method of the preferred embodiment can be adapted to the maintenance of the computer systems for delaying and activating unattended maintenance operations when it is not possible or more limited to do so with the standard commands available with the operating system of the computer.

The invention claimed is:

1. A method for allowing a user interfacing a computer with a console, to delay the execution of system administration operations and to have them executed in unattended mode on said computer, said method comprising the steps of:
   seizing identification of the user at the console and checking authorization,
   if the user is authorized, seizing at the console and storing in a working storage area the characteristics of the system currently active on the computer, parameters describing the administration operations to be performed on the computer, the type of system restart to be performed after administration operations in unattended mode the delay to be waited for before starting said administration operations,
   requiring to the operating system of the computer to start delay,
   when delay is expired, initializing the computer peripherals according to parameters describing the administration operations stored in the working storage area and setting the operating system in a sleeping state,
   performing the administration operations according to the administration operations parameters stored in the working storage area,
   retrieving from the working storage area the characteristics of the system which was active on the computer and the type of system restart to be performed after administration operations in unattended mode, and,
   restarting the system according to said retrieved information.

2. The method of claim 1, wherein the step of performing the administration operations further comprises a step of capturing and answering the messages from and to the operating system during the execution of the administration operations.

3. The method of claim 1 comprising an additional step of computing the delay after seizing the parameters describing the delay, said parameters comprising a day, hours and minutes.

4. The method of claim 1, wherein the step of seizing and checking authorization is the only step of the method if the user is not authorized.

5. The method of claim 1 further comprising, for each step of the method an additional step of logging the return code of execution of the step in the working storage area.

6. The method of claim 5 further comprising for each step of the method an additional step of analyzing the return code and executing the retrieving and restarting steps of the method if the result of the analyzing step is that the method cannot be completed.

7. The method of claim 6 wherein the result of the analyzing step being that the method cannot be completed is that a peripheral used for executing the administration operations cannot be initialized.

8. The method of claim 6 wherein the result of the analyzing step being that the method cannot be completed is that the operating system cannot be set in sleeping mode.

9. The method of claim 1, wherein the step of seizing and checking authorization further comprises a step of checking that the console used by the user is the operator console and if not, the user being unauthorized.

10. A computer program comprising instructions adapted for carrying out all the steps of the method according to claim 1 when said program is executed by a computer.

* * * * *